United States Patent [19]

Mills et al.

[11] Patent Number: 5,855,948
[45] Date of Patent: Jan. 5, 1999

[54] DRINK COMPOSITIONS UTILIZING GELATINISED STARCH AND METHOD OF MAKING

[75] Inventors: Peter Tempele John Mills, Capetown, South Africa; Clive Gristwood, Norwich, England

[73] Assignee: Robinsons Soft Drinks Limited, Chelmsford, England

[21] Appl. No.: 717,731
[22] Filed: Sep. 24, 1996
[51] Int. Cl.$^6$ .................................................. A23L 2/02
[52] U.S. Cl. .......................... 426/599; 426/548; 426/661
[58] Field of Search ................................ 426/599, 548, 426/661

[56] References Cited

U.S. PATENT DOCUMENTS

| | | | |
|---|---|---|---|
| 3,443,964 | 5/1969 | Marotta et al. | 99/83 |
| 3,917,852 | 11/1975 | Margulja et al. | 426/599 |
| 3,931,433 | 1/1976 | Eskritt et al. | 426/250 |
| 4,081,567 | 3/1978 | Haber | 426/580 |
| 5,624,698 | 4/1997 | Dake et al | 426/599 |

FOREIGN PATENT DOCUMENTS

| | | |
|---|---|---|
| 0 210 695 | 2/1987 | European Pat. Off. . |
| 0 301 440 | 2/1989 | European Pat. Off. . |
| 0 544 349 | 11/1992 | European Pat. Off. . |
| 0 553 368 | 8/1993 | European Pat. Off. . |
| 1 571 405 | 11/1976 | France . |
| 1170868 | 3/1968 | United Kingdom . |

*Primary Examiner*—Helen Pratt
*Attorney, Agent, or Firm*—Wolf, Greenfield & Sacks, P.C.

[57] ABSTRACT

This invention relates to drink compositions or drink concentrate compositions having no or low added sugar. The sweetness is provided by an intense sweetener, reducing or eliminating the amount of added sugar needed. No or low sugar drink compositions often lack 'non sweetness' characteristics such as body, texture and viscosity and appear weak and watery. The present invention uses gelatinized starch together with an intense sweetener. The gelatinised starch compensates for the thickening, non sweetness property of the missing added sugar giving the drink body and a thicker mouthfeel as well as a pleasant after taste. The drink may additionally contain acidulants, buffers, preservatives, colorants and fruit comminutes.

45 Claims, 3 Drawing Sheets

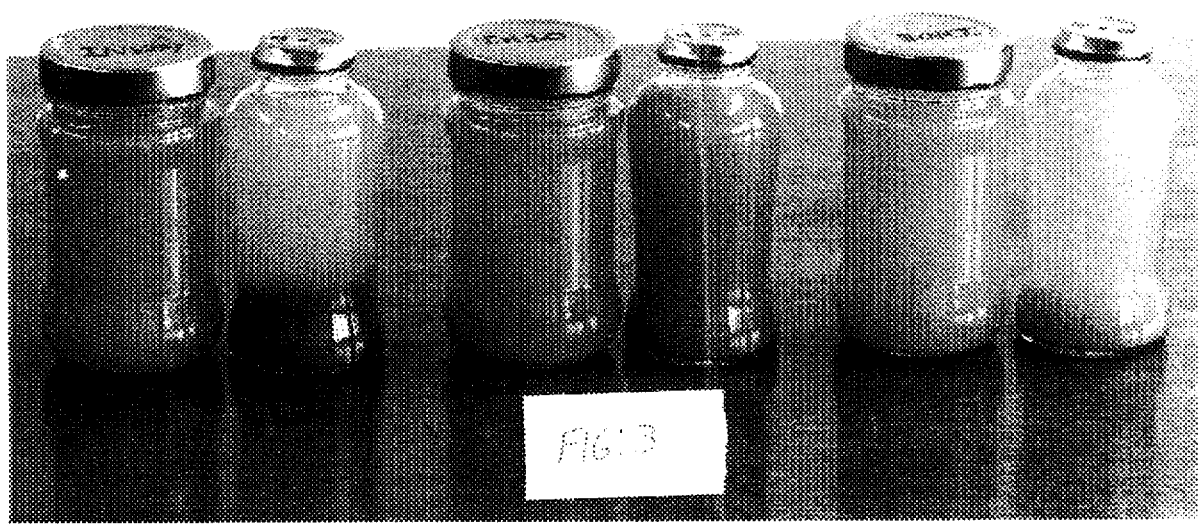

DRINK COMPOSITIONS UTILIZING GELATINISED STARCH AND METHOD OF MAKING

BACKGROUND OF THE INVENTION

This invention relates to drink compositions and, especially, but not exclusively, to soft drink compositions. It is particularly (although again not exclusively) applicable to drinks or drink compositions that have an intense sweetener. Such drinks typically do not contain any added sugar.

For the avoidance of doubt, by the term "no or low-added-sugar" as used herein is meant a drink composition which does not contain added sugar, or which contains only a low amount (relative to the amount necessary to obtain the desired sweetness if there were no other sweetener but sugar in the drink). The word "sugar" as used herein refers to sucrose, fructose, glucose, maltose and any other soluble carbohydrate sweetening material. Sugar may, however, be naturally and inherently present in other components of the composition.

In many foodstuffs, such as soft drink compositions, sugar is being replaced by intense sweeteners in order to reduce both the calorific content of the foodstuff and the cariogenic effects associated with sugar.

In addition to sweetening a foodstuff, the presence of sugar also provides a foodstuff with body, texture and viscosity. These so called "non-sweet" functional properties of sugar are often desired by the consumer and are generally dependent upon the level of sugar in the foodstuff.

Compared to sugar, many intense sweeteners have a very high sweetness intensity and are, therefore, required only in small amounts in a foodstuff to provide the desired sweetness profile. In a no-added-sugar soft drink composition, the low level of intense sweetener, coupled with the intense sweetener's poor non-sweet functional properties, may result in a no-added-sugar soft drink lacking in body, texture and viscosity. Many no-added-sugar soft drink compositions containing intense sweeteners therefore appear weak and "watery" and possess an unpleasant mouth feel. Furthermore, many consumers complain of an unpleasant aftertaste after drinking no-added-sugar soft drink compositions containing intense sweeteners.

Heretofore, a number of substances have been added to no-added-sugar soft drink compositions in an attempt to mimic the non-sweet functional properties of sugar.

EP-B-0210695 discloses a fruit juice comprising an intense sweetener and background pulp, such as a combination of pectin and cellulose.

EP-B-0301440 disclosed the use of hemicellulose A or B as a water soluble bulking agent in a foodstuff in order to provide for the functional properties of carbohydrates.

GB-A-1571405 discloses the use of potato pulp as a texturising agent in foodstuffs.

EP-A-0553368 discloses the use of partially debranched starch as a clouding agent in a fluid.

Stabilisers such as pectin, carboxy methyl cellulose and xanthan gum have also been used in no-added-sugar soft drink compositions to provide for some of the non-sweet functional properties of sugar.

Although many of the above detailed substances, when added to a no or low-added-sugar soft drink composition, may provide for the non-sweet functional properties of sugar, their use often results in a soft drink possessing a mouth feel which some consumers find unpleasant.

SUMMARY OF THE INVENTION

The present invention is directed to drink compositions, including soft drink compositions, that contain no or low-added sugar yet retain the "non-sweet" functional properties of sugar, such as increased viscosity and pleasant texture, that are often desired by a consumer. The drink compositions of the present invention also exhibit increased cloud density resulting in increased opacity and enhanced coloring.

The drink compositions comprise a gelatinised starch and an intense sweetener, such as sodium saccharin, aspartame, or the like, wherein the ratio of gelatinised starch to intense sweetener is in the range of from 12:5 to 200:1. Drink compositions of the present invention can optionally further comprise an acidulant, a buffering agent, a preservative, a colorant, carbonated water, and/or fruit comminute. In alternative embodiments, drink compositions of the present invention can contain from 8 to 18% v/v of a juice, such as that extracted from orange, black currant, peach, raspberry, strawberry, apple, and mixtures thereof.

Furthermore, a method of thickening the mouth feel of a drink composition is provided. The method comprises adding a sufficient amount of an intense sweetener to the drink composition and adding gelatinised starch to the drink composition in an amount sufficient to provide a ratio of gelatinised starch to intense sweetener in the range of from about 12:5 to about 200:1. The gelatinised starch can be derived from a cereal, such as a cereal containing barley. The method of the present invention is useful for producing no or low added sugar drinks that retain the "non-sweet" functional properties of sugar.

BRIEF DESCRIPTION OF THE DRAWINGS

These and other advantages of the drink compositions of the present invention become more evident with reference to the following detailed description when viewed in light of the enclosed figures, wherein:

FIG. 3 is a photograph showing three pairs of drinks, each pair having one drink with gelatinised starch and the other without.

DETAILED DESCRIPTION

Figure 1:
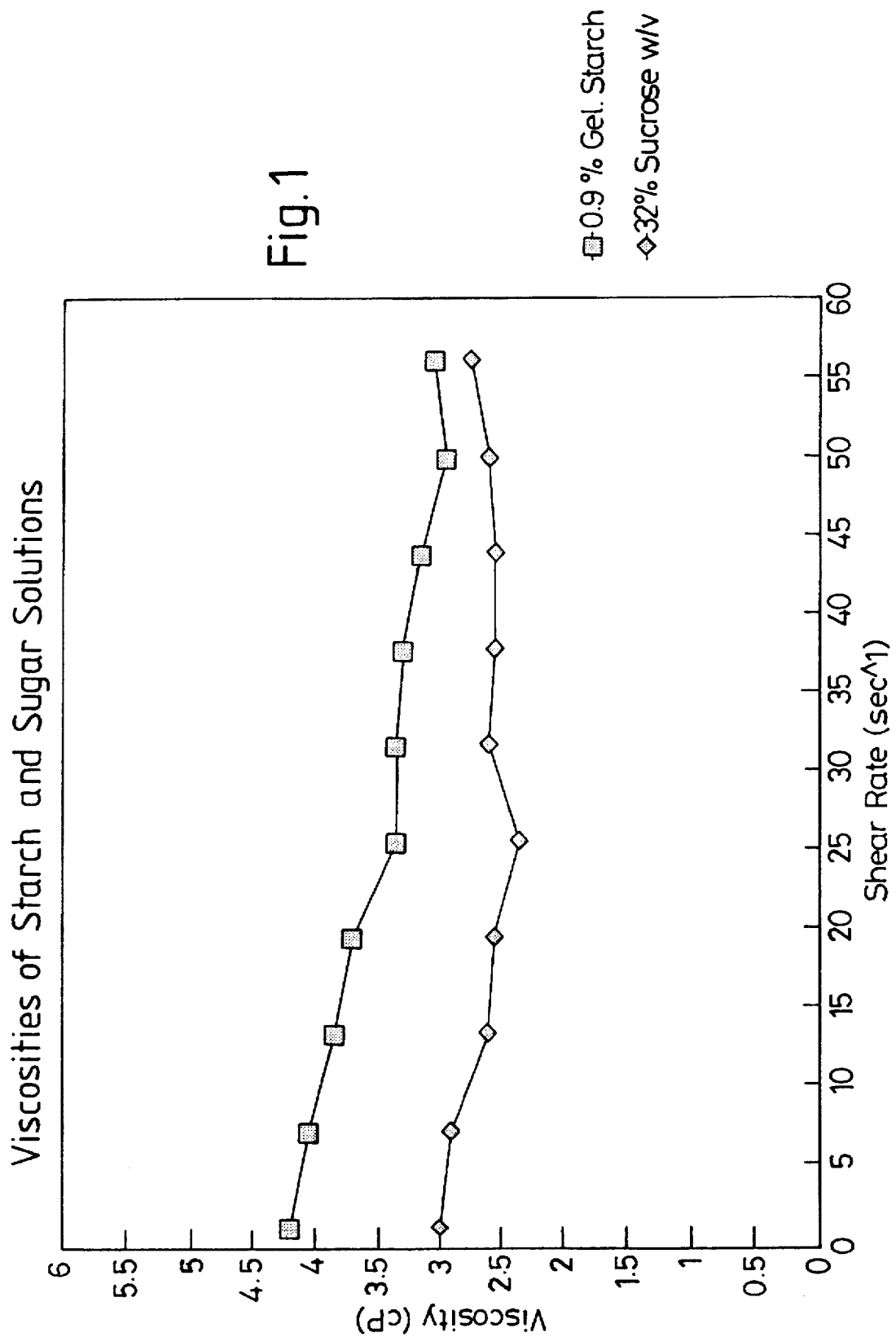
FIG. 1 is a graph comparing the viscosity vs. Shear rate of a concentrated sugar solution with that of a drink composition according to the present invention.

Accordingly, the present invention provides a drink composition comprising a gelatinised starch and an intense sweetener. The ratio of gelatinised starch to intense sweetener is preferably in the range of from 12:5–200:1.

Preferably the ratio of gelatinised starch to intense sweetener is in the range of from 7:2–20:1, more preferably in the range from 4:1–65:4. More preferably still the ratio of gelatinised starch to intense sweetener is approximately 7:1. Most preferably the intense sweetener is aspartame. It will be appreciated that the concentration of both gelatinised starch and intense sweetener are usually both measured in the same units (weight per unit volume of the drink composition).

It will be appreciated that the sweetening effect of a unit of weight of an intense sweetener differs. This is traditionally taken into account by giving each intense sweetener an equivalent sweetness value relative to sugar. The ranges given above of relative amounts of gelatinised starch to intense sweetener are for aspartame, and if a different intense sweetener is used we prefer to modify the ranges by multiplying by the ratio of the sugar equivalent sweetness ratio of the other intense sweetener to that of aspartame to take that into account. This does not matter so much for the wider ranges, but may affect things more for the narrower ranges.

If a "cocktail" of different intense sweeteners is used we would envisage multiplying the ranges by an equivalent sweetness weighted figure dependent upon the proportions of each component of the cocktail.

The drink composition may be ready to drink (i.e. does not need diluting).

A further aspect of the present invention is to provide a drink concentrate composition comprising:

(i) in the range of from 0.6–2.0% w/v of a gelatinised starch, (ii) in the range of from 0.01–0.25% w/v of an intense sweetener, (iii) in the range of from 5–40% v/v of a juice, (iv) in the range of from 0–1% v/v of a flavouring, and (v) the balance of water.

Preferably the drink concentrate composition comprises from 0.7 to 1.6% w/v, more preferably from 0.8–1.3% w/v, of a gelatinised starch and from 0.08–0.18% w/v of an intense sweetener. More preferably still the concentrate composition comprises approximately 0.9% w/v of a gelatinised starch and approximately 0.13% w/v of an intense sweetener.

Preferably the drink composition comprises 5–40% v/v of a juice (eg fruit juice).

Preferably the drink composition comprises 0–1% v/v of a flavouring.

Preferably the drink composition comprises water as the balance of the composition.

Preferably the drink composition is in the form of a concentrate comprising:

(i) in the range of from 0.6–2.0% w/v of a gelatinised starch, (ii) in the range of from 0.01–0.25% w/v of an intense sweetener, (iii) in the range of from 5–40% v/v of a juice, (iv) in the range of from 0–1% v/v of a flavouring, and (v) the balance of water.

Again, in the above the amount of intense sweetener is preferably given for aspartame, and we may prefer to modify the amount if a different intense sweetener is used by a multiplier that comprises the ratio of the equivalent sweetness of aspartame to that of the other sweetener.

Preferably the drink is a soft drink. The drink may be a no, or low, added sugar drink. The drink may be a no-added sugar drink.

In the compositions of the present invention the starch is in a gelatinised form. The gelatinised starch in the compositions according to the present invention may be derived from plants, roots, tubes, seeds or fruits. Preferably it is derived from barley, maize, wheat, tapioca or waxy maize. Apart from native starches the starch used could also be modified starch. Modified starch refers to native starch (for example maize, wheat, tapioca, waxy maize or a mixture of two or more thereof) which has been modified to change the gelatinisation characteristics. The modification process may involve cross linking of the glucose chains or the substitution of side groups on the glucose chains. The above processes are performed using reagents such as sodium trimetaphosphate to crosslink and propylenoxide to substitute the glucose side groups. Furthermore, the starch may be pregelatinised and dried before being added to the product.

In the present invention the starch used, modified or native, will be in a gelatinised form in the final product.

The intense sweetener in the compositions according to the present invention may be any of the commercially available intense sweeteners, such as sodium saccharin, acesulfame K or aspartame, or a mixture of two or more thereof.

Preferably the concentrate compositions according to the present invention comprise from 8–18% v/v of juice. The juice is preferably obtained by the extraction and concentration by evaporation of juices extracted from fresh fruit, such as orange, blackcurrant, peach, raspberry, strawberry, apple, pear, grapefruit, passionfruit, pineapple, guava, or mango, including a mixture of two or more thereof. For incorporation into the compositions of the present invention the juice may be sourced from concentrated juice or single strength juice. Single strength juice may contain inherently up to 10% w/v of natural sugar. Preferably the juice incorporated into the concentrate composition according to the present invention provides from 0.5–4% w/v of natural sugar in the concentrate composition.

The compositions according to the present invention may be flavoured by one or more commercially available flavourings, such as those available from such flavour houses as Givaudan-Roure, Firmenich, IFF, Quest or Haarmann and Reimer.

The drink compositions of the present invention may further comprise one or more of any of the following components:

1) an acidulant 2) a buffering agent 3) a preservative 4) a colourant 5) a fruit comminute The acidulant may be a fruit acid, such as malic acid, citric acid or lactic acid, or a mixture thereof. The buffering agent may be sodium citrate, potassium citrate, calcium citrate, sodium malate, potassium malate, calcium malate, or a mixture thereof, but is preferably sodium citrate.

The preservative may be potassium sorbate, sodium metabisulphite or sodium benzoate, or a mixture of two or more thereof. The colourant may be carotene, anthocyanin, or any other natural or artificial colouring, or a mixture thereof. Examples are grapeskin extract, beta-carotene, carmine cochineal, tartrazine, sunset yellow FCF and brilliant blue FCF. The fruit comminute may be concentrated orange, blackcurrant, peach, raspberry, strawberry, apple pear, grapefruit, passionfruit, guava, or mango fruit comminute, or a mixture of two or more thereof.

It will be understood that the drink concentrate composition according to the present invention may be diluted with water in order to obtain a no-added-sugar drink. Preferably, the drink should be diluted one part by volume of concentrate composition and approximately four parts by volume of water. It will be understood, however, that the concentrate composition may be diluted with water to a variety of degrees depending upon the consumer's preference. If desired the drink composition of the present invention may be presented in a ready to drink form.

In another aspect the present invention provides a drink comprising carbonated water.

In a further aspect the present invention provides a drink composition in a frozen form, such as an iced beverage, an ice lolly, a frozen concentrate and the like.

Preferably the drink composition has an emulsion component.

The drink may have a dairy product component which may be milk, cream, yoghurt or an extract from any of these.

Preferably the drink composition comprises a potable alcohol content, this alcohol content may be about 1%, 2%, 3%, 4%, 5% or 6% or above vol/vol.

The drink compositions according to the present invention contain levels of a gelatinised starch and an intense sweetener such that the compositions' organoleptic and physical characteristics closely match those of sugar sweetened drink compositions. That is, the drink compositions according to the present invention possess a sweetness profile and a body, viscosity, texture and mouth feel normally associated with sugar sweetened drink compositions. The drink compositions according to the present invention do not suffer from the unpleasant aftertaste and the unattractive "watery" appearance which some intensely sweetened drink compositions possess. Indeed, the drink compositions according to the present invention possess a pleasant lingering aftertaste and an attractive visual appearance. These last two properties will be discussed further later.

Because the drink compositions according to the present invention do not rely upon stabilisers such as pectin, xanthan gum and carboxy methyl cellulose to provide body in the drink, they do not suffer from the "slimy" mouth feel sometimes associated with such stabilisers.

It is important in some embodiments of the present invention that the starch used in the drink compositions is pure, that is that it does not contain, for example, proteins and insoluble fibres. These impurities could lead to unstable products with sediment e.g. protein-anthocyanin sediment. Impure sources of starch such as potato pulp could thus cause problems.

According to the present invention a method is provided of thickening the mouth feel of a drink comprising having as a component of the drink gelatinised starch.

Preferably the method comprises selecting starch cereal, eg barley, to gelatinise and gelatinising it.

Preferably the method comprises putting the particulated starch into a drink or drink concentrate for subsequent dilution, and then gelatinising the starch. Alternatively the starch may be gelatinised before addition to the drink.

Preferably the method comprises reducing or eliminating the amount of added sugar added to the drink or concentrate by using a concentrated sweetener to provide the sweetness that is not provided by the missing added sugar, and using the gelatinised starch to compensate for the thickening, non sweetness property of the missing added sugar.

Preferably the method comprises adding no, or substantially no, added sugar to the drink or concentrate.

According to the present invention gelatinised starch is used in the preparation of a drink or drink concentrate, for the achievement of a thicker mouthfeel to the drink (or eventual drink after dilution).

Preferably gelatinised starch is used in the preparation of no, or low, added sugar drinks to replace at least some of the non-sweetness properties that sugar would have in the corresponding drink if it were to contain sugar.

In FIG. 1, the concentrated sugar solution comprises approximately 32% w/v of sucrose. The typical concentrate composition according to the present invention has an intense sweetener level equivalent to approximately 28% w/v of sucrose; a further approximately 4% w/v of sugar being provided inherently by the juice concentrate. Consequently, a typical concentrate composition according to the present invention has a sweetness level equivalent to a concentrated sugar solution comprising approximately 32% w/v of sucrose.

The viscosity measurements were carried out using a Brookfield Viscometer and a low viscosity spindle (LV/ULA). From the graph shown in FIG. 1, it is clear that the viscosities of the concentrated sugar solution and the typical concentrate composition according to the present invention are similar. It is also clear that the concentrated sugar solution is more Newtonian in behaviour than the typical concentrate composition.

It will be understood that FIG. 1 relates to a concentrate composition which is to be diluted with water before being consumed as a no-added-sugar soft drink. Typically, the concentrate composition is diluted to the degree of one part by volume of concentrate composition to approximately four parts by volume of water. Accordingly, in this case, the resultant no-added-sugar soft drink has a sweetness level equivalent to a sugar solution comprising approximately 6.4% w/v of sugar. However, it will be understood that the concentrate composition may be diluted to a variety of degrees depending upon the consumer's preference with the corollary of a variety of sweetness levels.

The present invention will be further described with reference to the following Examples:

EXAMPLE 1

Peach Flavoured Concentrate Composition

A no-added-sugar soft drink concentrate composition comprising the following components:

| (a) | starch (derived from barley) | 0.90% w/v |
|---|---|---|
| (b1) | aspartame | 0.08% w/v |
| (b2) | sodium saccharin | 0.05% w/v |
| (c) | concentrated peach juice (6X) | 2.00% v/v |
| (d) | peach flavouring | 0.25% v/v |
| (e) | citric acid | 1.00% w/v |
| (f) | trisodium citrate | 0.55% w/v |
| (g) | sodium metabisulphite | 0.02% w/v |
| (h) | potassium sorbate | 0.10% w/v |
| (i) | beta-carotene (1%) | 0.07% w/v |
| (j) | water | add to make up to 100% v | was prepared by the following process (1) A portion of component (j), approximately 60%, was added to a low shear laboratory mixer and stirred continuously;

(2) component (c) was then added and blended into the solution;

(3) components (e), (f) and (g) were then added and allowed time to dissolve completely;

(4) component (i) was then added and allowed time to dissolve completely;

(5) components (b1), (b2), (d) and (h) were then added and allowed time to dissolve completely;

(6) component (a) in un-gelatinised form was then added; and (7) finally, the remaining portion of component (j) was added to obtain the desired volume.

The above blended concentrate composition was then introduced into a high temperature short time plate heat exchanger system, which served to pasteurise the concentrate composition and also to gelatinise the starch, component (a). The heat exchanger system enabled the rapid heating of the concentrate composition in a hold tube to a selected temperature and for a selected period of time. To ensure that pasteurisation had occurred, the concentrate composition was held at a temperature of approximately 94° C. for at least 13 seconds. To ensure that gelatinisation of a component (a) had occurred, the concentrate composition was held at a temperature in the range of from 110°–130° C. for a time in the range of from 20–30 seconds.

The resultant concentrate composition was then diluted with water, typically one part by volume of the concentrate composition to approximately four parts by volume of water, in order to produce a no-added-sugar soft drink. However, it will be understood that the concentrate composition may be diluted to a variety of degrees depending upon the consumer's preference. An experimental panel of tasters considered the resultant no-added-sugar soft drink to possess a thick and smooth mouth feel, a good body and a pleasant lingering aftertaste; properties normally associated with products which are sugar sweetened.

EXAMPLE 2

Blackcurrant Flavoured Concentrate Composition

A no-added-sugar soft drink concentrate composition comprising the following components:

| (a) | starch | 0.90% w/v |
|---|---|---|
|   | (derived from barley) |   |
| (b1) | aspartame | 0.08% w/v |
| (b2) | sodium saccharin | 0.05% w/v |
| (c) | concentrated blackcurrant juice (6X) | 1.50% v/v |
| (d) | blackcurrant flavouring | 0.10% v/v |
| (e) | citric acid | 1.00% w/v |
| (f) | trisodium citrate | 0.55% w/v |
| (g) | sodium metabisulphite | 0.02% w/v |
| (h) | potassium sorbate | 0.10% w/v |
| (i) | grapeskin extract | 0.50% w/v |
| (j) | water | add to make up to 100% v | was prepared by the same process as detailed in Example 1.

The resultant concentrate composition was then diluted with water (typically one part by volume of the concentrate composition to approximately four parts by volume of water) in order to produce a no-added-sugar soft drink. The resultant no-added-sugar soft drink possessed a thick and smooth mouth feel, good body and a pleasant lingering aftertaste.

EXAMPLE 3

Apple, Strawberry and Raspberry Flavoured Concentrate Composition

A no-added-sugar soft drink concentrate composition comprising the following components:

| (a) | starch | 0.90% w/v |
|---|---|---|
|   | (derived from barley) |   |
| (b1) | aspartame | 0.08% w/v |
| (b2) | sodium saccharin | 0.05% w/v |
| (c) | conc. summer fruit juice (8.37X) | 2.00% v/v |
| (d) | summer fruit flavouring | 0.10% V/V |
| (e) | citric acid | 1.00% w/v |
| (f) | trisodium citrate | 0.55% w/v |
| (g) | sodium metabisulphite | 0.02% w/v |
| (h) | potassium sorbate | 0.10% w/v |
| (i) | grapeskin extract | 0.20% w/v |

-continued

| (j) | water | add to make up to 100% v |
|---|---|---|
|   | (summer fruit juice concentrate | 80% v/v apple, 10% v/v strawberry and 10% v/v raspberry) | was prepared by the same process as detailed in Example 1.

The resultant concentrate composition was then diluted with water (typically one part by volume of the concentrate composition to approximately four parts by volume of water) in order to produce a no-added-sugar soft drink. The resultant no-added-sugar soft drink possessed a thick and smooth mouth feel, good body and a pleasant lingering aftertaste.

EXAMPLE 4

Orange Flavoured Concentrate Composition

A no-added-sugar soft drink concentrate composition comprising the following components:

| (a) | starch | 0.90% w/v |
|---|---|---|
|   | (derived from barley) |   |
| (b1) | aspartame | 0.08% w/v |
| (b2) | sodium saccharin | 0.05% w/v |
| (c) | concentrated orange juice (6X) | 2.20% v/v |
| (c) | concentrated orange comminute (4X) | 1.20% v/v |
| (d) | orange flavouring | 0.04% v/v |
| (e) | citric acid | 1.00% w/v |
| (f) | trisodium citrate | 0.55% w/v |
| (g) | sodium metabisulphite | 0.02% w/v |
| (h) | potassium sorbate | 0.10% w/v |
| (i) | beta-carotene (1%) | 0.03% w/v |
| (j) | water | add to make up to 100% v | was prepared by the same process as detailed in Example 1.

The resultant concentrate composition was then diluted with water (typically one part by volume of the concentrate composition to approximately four parts by volume of water) in order to produce a no-added-sugar soft drink. The resultant no-added-sugar soft drink possessed a thick and smooth mouth feel, good body and a pleasant lingering aftertaste.

EXAMPLE 5

Blackcurrant Flavoured Concentrate Compositions Where the Starch Level is Varied No-added-sugar soft drink concentrate compositions comprising the following components:

| (a) | starch | 0.80, 1.20, 1.60 & 2.00% w/v |
|---|---|---|
|   | (derived from barley) |   |
| (b1) | aspartame | 0.08% w/v |
| (b2) | sodium saccharin | 0.05% w/v |
| (c) | concentrated blackcurrant juice (6X) | 1.50% v/v |
| (d) | blackcurrant flavouring | 0.10% v/v |
| (e) | citric acid | 1.00% w/v |
| (f) | trisodium citrate | 0.55% w/v |
| (g) | sodium metabisulphite | 0.02% w/v |
| (h) | potassium sorbate | 0.10% w/v |

| | | |
|---|---|---|
| (i) | grapeskin extract | 0.50% w/v |
| (j) | water | add to make up to 100% v | were prepared by the same general process as detailed in Example 1.

The resultant concentrate compositions were then diluted with water (typically one part by volume of the concentrate compositions to approximately four parts by volume of water) in order to produce no-added-sugar soft drinks. Increasing the gelatinised starch content in the concentrate compositions resulted in a more viscous no-added-sugar soft drink and provided body and texture, which would otherwise be lacking due to the absence of added sugar. At higher levels, the gelatinised starch also acted as a thickening agent providing further texture to the no-added-sugar soft drink, a feature which may be desirable in certain products. At a gelatinised starch content of 2.0% w/v in the concentrate, the no-added-sugar drink developed gel-like properties.

EXAMPLE 6

Orange Flavoured Concentrate Composition with a High Sweetness Level.

A no-added-sugar soft drink concentrate composition comprising the following components:

| | | |
|---|---|---|
| (a) | starch (derived from barley) | 1.20% w/v |
| (b1) | aspartame | 0.10% w/v |
| (b2) | sodium saccharin | 0.05% w/v |
| (c) | concentrated orange juice (6X) | 2.20% v/v |
| (c) | concentrated orange comminute (4X) | 1.20% v/v |
| (d) | orange flavouring | 0.04% v/v |
| (e) | citric acid | 1.00% w/v |
| (f) | trisodium citrate | 0.55% w/v |
| (g) | sodium metabisulphite | 0.02% w/v |
| (h) | potassium sorbate | 0.10% w/v |
| (i) | beta-carotene (1%) | 0.03% w/v |
| (j) | water | add to make up to 100% v | was prepared by the same process as detailed in Example 1.

The resultant concentrate composition was then diluted with water (typically one part by volume of the concentrate composition to approximately four parts by volume of water) in order to produce a no-added-sugar soft drink. The resultant no-added-sugar soft drink possessed a thick and smooth mouth feel, good body, a pleasant lingering aftertaste and a high sweetness level.

EXAMPLE 7

A Ready to Drink Product with a High Ratio of Starch to Artificial Sweetener (160:1)

A no-added-sugar soft drink composition comprising the following components:

| | | |
|---|---|---|
| (a) | starch (derived from barley) | 1.60% w/v |
| (b2) | sodium saccharin | 0.01% w/v |
| (c) | concentrated blackcurrant juice (6X) | 0.85% v/v |
| (d) | blackcurrant flavouring | 0.025% v/v |
| (e) | citric acid | 0.20% w/v |
| (f) | trisodium citrate | 0.11% w/v |
| (g) | sodium metabisulphite | 0.004% w/v |
| (h) | potassium sorbate | 0.02% w/v |
| (i) | grapeskin extract | 0.10% w/v |
| (j) | water | add to make up to 100% v | was prepared by the process detailed in Example 1.

This product was a ready to drink composition. The product possessed a very thick mouth feel and was not particularly sweet (equivalent sweetness of about 4.5% sugar).

EXAMPLE 8

Blackcurrant Flavoured Concentrate Composition with a Low Ratio of Starch to Artificial Sweetener (3:1)

A no-added-sugar soft drink concentrate composition comprising the following components:

| | | |
|---|---|---|
| (a) | starch (derived from barley) | 0.60% w/v |
| (b1) | aspartame | 0.20% w/v |
| (c) | concentrated blackcurrant juice (6X) | 1.67% v/v |
| (d) | blackcurrant flavouring | 0.10% V/V |
| (e) | citric acid | 1.00% w/v |
| (f) | trisodium citrate | 0.55% w/v |
| (g) | sodium metablisulphite | 0.20% w/v |
| (h) | potassium sorbate | 0.10% w/v |
| (i) | grapeskin extract | 0.50% w/v |
| (j) | water | add to make up to 100% v | was prepared by the same process as detailed in Example 1.

The resultant concentrate composition was then diluted with water (typically one part by volume of the concentrate composition to in the range of from four to six parts by volume of water) in order to produce a no-added-sugar soft drink. The resultant no-added-sugar soft drink possessed a thick and smooth mouth feel, which was not as pronounced as the mouth feel possessed by the compositions according to Examples 1–4.

EXAMPLE 9

Blackcurrant Flavoured Concentrate Composition Comprising Modified Starch

A no-added-sugar soft drink concentrate composition comprising the following components:

| | | |
|---|---|---|
| (a) | modified starch (Purity w from National Starch) | 0.90% w/v |
| (b1) | aspartame | 0.08% w/v |
| (b2) | sodium saccharin | 0.05% w/v |
| (c) | concentrated blackcurrant juice (6X) | 1.50% v/v |
| (d) | blackcurrant flavouring | 0.10% V/V |
| (e) | citric acid | 1.00% w/v |
| (f) | trisodium citrate | 0.55% w/v |
| (g) | sodium metabisulphite | 0.02% w/v |
| (h) | potassium sorbate | 0.10% w/v |
| (i) | grapeskin extract | 0.50% w/v |
| (j) | water | add to make up to 100% v | was prepared by the same process as detailed in Example 1.

The resultant concentrate composition was then diluted with water (typically one part by volume of the concentrate composition to in the range of from four to six parts by volume of water) in order to produce a no-added-sugar soft drink.

The resultant no-added-sugar soft drink had similar organoleptic properties to the drink according to Example 2, but possessed significantly less turbidity.

We have also been surprised to find that the use of gelatinised starch can improve the visual appearance of drink compositions, especially coloured drink compositions. It can make them brighter in colour, and make them more opaque.

In particular we have made a soft drink concentrate for pear, and for pink grapefruit, dilute to drink drinks. The colour of these with the gelatinised starch was a deeper, more opaque, brighter flat colour in comparison with similar drinks which had no gelatinised starch. This gave them, especially the pink grapefruit, an unusual colour.

This effect is also seen in ready to drink formulations, but is more noticeable in the concentrates.

According to another aspect the invention comprises the use of gelatinised starch in a drink composition to improve its visual appearance, preferably to brighten and/or deepen its colour.

The gelatinised starch gives, in some embodiments, a uniform "cloud" to the drink, and may make it more opaque. This may help to give a flat, bright, colour.

Figure 2:
FIG. 2 is a photograph of two drinks that contain sedimentary material, one of which contains gelatinised starch and the other of which does not.

FIG. 2 shows on the left a soft fruit drink (in this example guava) which is made with 1.4% w/v gelatinised starch (as well as 8.4% w/v dry weight sugar; 1.5% v/v guava fruit juice concentrate (68 Brix); 0.35% w/v citric acid; 0.02% w/v colour (anthrocyanin); 1.5% v/v guava fruit flavour; and the rest water). On the right is the same drink composition, but With no gelatinised starch.

FIG. 2 shows what the two drink compositions look like after standing still for about 1 month. They look very much the same after standing for 6 months. The sedimentary material in the drink without gelatinised starch has settled out at the bottom to form a dark layer, and leaving a much paler, and a cleaner, "supernatant" above it. In the drink with gelatinised starch there is a uniform cloud, of uniform colour.

In the case of guava the sedimentary material can settle out in a matter of days. Other sedimentary materials may take longer to settle out.

When the two drinks of FIG. 2 are shaken, so as to give the right hand (non-gelatinised starch) drink a cloud, we are surprised to find that the colour of the gelatinised starch drink is different: it has a "flatter", more intense colour. With some drinks, such as guava, it is a less noticeable difference than with other drinks, eg pink grapefruit.

We have tested the colour of some drinks which are similar to those discussed in the examples and which have gelatinised starch at very roughly about 1% w/v. We tested the colour in the known Hunter Lab colorimeter which gives a colour a co-ordinate position within a standard colour cylinder. The results are given in the following table:

| Product | L | a | b |
|---|---|---|---|
| Peach Drink | 49.8 | 16.4 | 56.3 |
| Orange Drink | 64.6 | 0.9 | 1.5 |
| Pink Grapefruit Drink | 54.4 | 24.8 | 19.0 |
| Pear Drink | 61.8 | 4.1 | 67.2 |
| Red Berry Drink | 35.9 | 40.1 | 17.2 |

These co-ordinates can be used to plot the relative colours and their intensities, which results in a degree of measurement of opacity.

When the same measurements are made on equivalent drinks, but with the drinks having no gelatinised starch the colour density was found to be lower. The colour had been altered in some cases by at least 2%, or at least 5% or 10% (or higher) when gelatinised starch was used, and in other cases by perhaps at least 15%, 20% or 25% or higher (or even more). We would aim in some embodiments to achieve a change in colour density of 5% to 15%, most preferably about 10%.

The gelatinised starch increases the cloud density of the drink, making it more opaque and increasing the light absorbence. The appearance of the drink is lighter, brighter, than an equivalent without gelatinised starch. The use of gelatinised starch increases the depth of colour and gives the drink a matt, flat, effect, instead of being translucent. The drink is "whiter", as if milk had been poured into it.

FIG. 3 shows, working from the left, a pair of passion fruit juice drink compositions, with and without gelatinised starch (the drink on the left of each pair has the gelatinised starch) at a level of about 1% w/v (1.0% w/v for the passionfruit, and 1.4% for the mango and guava drinks).

The second pair of drinks is a mango fruit juice concentrate, and puree, pair.

The third (right hand) pair of drinks is the guava fruit juice drink of FIG. 2.

All of the drinks of FIG. 3 are at ready to drink strength and have stood for about 3 months (although little difference can be seen if they stand for 6 months, or even longer).

The guava fruit based sedimentary material comes out of suspension most noticeably, and the effect of using gelatinised starch is most noticeable in that pair (the right hand pair).

The passion fruit based sedimentary material also has a very marked tendency to come of out suspension and the effect of using gelatinised starch is readily noticeable in that pair (the left hand pair).

The mango fruit based sedimentary material comes out of suspension less readily than the other two, but the effect of using gelatinised starch can still be seen (the mango drink without it has a colour gradation from top to bottom, getting darker towards the bottom).

We have also conducted tests on the taste of drinks with gelatinised starches. Whilst taste is a subjective matter, we have found that a significant proportion of tasters preferred the taste of a drink with gelatinised starch to that of the equivalent drink, with no gelatinised starch. We were surprised to discover that the gelatinised starch appeared to be enhancing the taste of the drink (not just increasing the "body" and mouthfeel—the comparative drink had sugar to the equivalent sweetness level).

According to a further aspect the invention comprises the use of gelatinised starch to improve the taste of a drink.

Thus in the embodiments that we have produced the gelatinised starch improved the visual appearance of a drink not only by keeping cellular and other sedimentary material (eg pectates, ground peel) in suspension (instead of letting it settle out) but also contributed to a uniform appearance of the drink composition by providing cloud. This helps to make the drink more opaque, and can give a "flatter", more intense colour (where the drink is coloured).

It is extremely surprising to us that gelatinised starch improved the mouthfeel of the examples of the drink we prepared, improved its colour, improved the stability of suspended particles in the drink, and even appears to improve the taste of the drink.

We claim:

1. A drink composition, comprising:
   a) less than about 4% w/v of natural sugar;
   b) a gelatinised starch; and
   c) an intense sweetener, wherein the ratio of gelatinised starch to intense sweetener is in the range of from 12:5–200:1.

2. A drink composition as claimed in claim 1, wherein the ratio of gelatinised starch to intense sweetener is in the range of from 7:2–20:1.

3. A drink composition as claimed in claim 2, wherein the ratio of gelatinised starch to intense sweetener is approximately 7:1.

4. A drink composition as claimed in claim 1 that is ready to drink (i.e. does not need diluting).

5. A drink composition as claimed in claim 1 in the form of a concentrate comprising:
   (i) in the range of from 0.6–2.0% w/v of a gelatinised starch,
   (ii) in the range of from 0.01–0.25% w/v of an intense sweetener.

6. A drink composition as claimed in claim 5 comprising from 0.7–1.6% w/v of a gelatinised starch and from 0.08–0.18% w/v of an intense sweetener.

7. A drink composition as claimed in claim 6 comprising approximately 0.9% w/v of a gelatinised starch and approximately 0.13% w/v of an intense sweetener.

8. A drink composition according to claim 5 which further comprises in the range 5–40% v/v of a juice (e.g. fruit juice).

9. A drink composition according to claim 8 comprising from 8–18% v/v of a juice.

10. A drink composition as claimed in claim 8, which includes a juice extracted from fresh orange, blackcurrant, peach, raspberry, strawberry or apple fruits, or a mixture of two or more thereof.

11. A drink composition according to claim 5 which further comprises in the range 0–1% v/v of a flavouring.

12. A drink composition according to claim 5 which further comprises water as the balance of the composition.

13. A drink composition according to claim 1 in the form of a concentrate comprising:
   (i) in the range of from 0.6–2.0% w/v of a gelatinised starch,
   (ii) in the range of from 0.01–0.25% w/v of an intense sweetener,
   (iii) in the range of from 5–40% v/v of a juice,
   (iv) in the range of from 0–1% v/v of a flavouring, and
   (v) the balance of water.

14. A drink according to claim 1 that is a soft drink.

15. A drink according to claim 1 that is a low added sugar drink.

16. A drink according to claim 1 that is a no-added sugar soft drink.

17. A drink composition as claimed in claim 1, wherein the intense sweetener is sodium saccharin, acesulfame K or aspartame, or a mixture of two or more thereof.

18. A drink composition as claimed in claim 1, wherein the gelatinised starch is derived from a cereal.

19. A drink composition according to claim 18 in which the cereal is barley.

20. A drink composition as claimed in claim 1, wherein juice is incorporated into the composition and provides from 0.5–4% w/v of natural sugar in the concentrate.

21. A drink composition as claimed in claim 1, further comprising an acidulant.

22. A drink composition as claimed in claim 21, wherein the acidulant is malic acid, citric acid or lactic acid, or a mixture of two or more thereof.

23. A drink composition as claimed in claim 1, further comprising a buffering agent.

24. A drink composition as claimed in claim 23, wherein the buffering agent is sodium citrate.

25. A drink composition as claimed in claim 1, further comprising a preservative.

26. A drink composition as claimed in claim 25, wherein the preservative is potassium sorbate, sodium metabisulphite or sodium benzoate, or a mixture of two or more thereof.

27. A drink composition as claimed in claim 1, further comprising a colorant.

28. A drink composition as claimed in claim 27, wherein the colourant is carotene or anthocyanin, or a mixture thereof.

29. A drink composition as claimed in claim 1, further comprising fruit comminute.

30. A drink composition as claimed in claim 1 which is in a frozen form.

31. A drink composition according to claim 1 that has an emulsion component.

32. A drink composition according to claim 1 that has a dairy product component.

33. A drink composition according to claim 32 that has a component that is milk, cream, yoghurt, or is any extract from any of them.

34. A drink composition as claimed in claim 1 that further comprises a potable alcohol component.

35. A drink composition as claimed in claim 34 in which the alcohol is about 1%, or above, vol/vol.

36. A drink composition according to claim 1 that has a more intense colour than it would have if it were to have no gelatinised starch.

37. A drink composition comprising a concentrate as claimed in claim 5 or 13 diluted with water.

38. A drink composition as claimed in claim 37, comprising one part by volume of the concentrate and approximately four parts by volume of water.

39. A drink composition as claimed in claim 37 wherein the water to dilute the concentrate is carbonated.

40. A drink composition as claimed in claim 39 which is in ready to drink form.

41. A drink composition as claimed in claim 37 which is in ready to drink form.

42. A method of thickening the mouth feel of a drink composition, said method comprising:
   a) providing a drink composition having 4% w/v of natural sugar;
   b) dissolving a sufficient amount of an intense sweetener in the drink composition; and
   c) adding a gelatinised starch to the drink composition in an amount sufficient to provide a ratio of gelatinised starch to intense sweetener in the range of from about 12:5 to about 200:1.

43. A method of thickening the mouth feel of a drink composition, said method comprising:
   a) providing a drink composition having less than about 4% w/v of natural sugar;
   b) dissolving a sufficient amount of an intense sweetener in the drink composition;
   c) adding a particulated starch to the drink composition; and
   d) heating the drink composition at a sufficient temperature and for a sufficient time to gelatinise the starch, whereby the drink composition has a ratio of gelatinised starch to intense sweetener in the range of from about 12:5 to about 200:1.

44. The method according to claim 43, wherein the starch is derived from a cereal.

45. The method according to claim 44, wherein the cereal comprises barley.

* * * * *